April 10, 1934.  H. G. BEETTAM, JR  1,954,467
BRAKE MECHANISM
Filed April 28, 1932
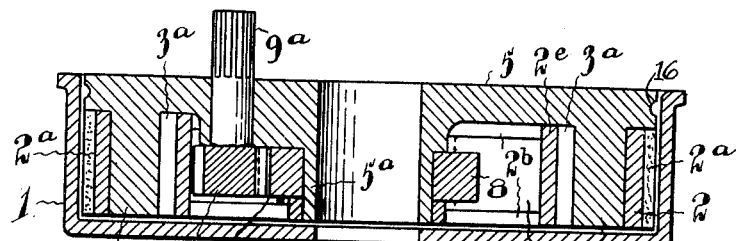
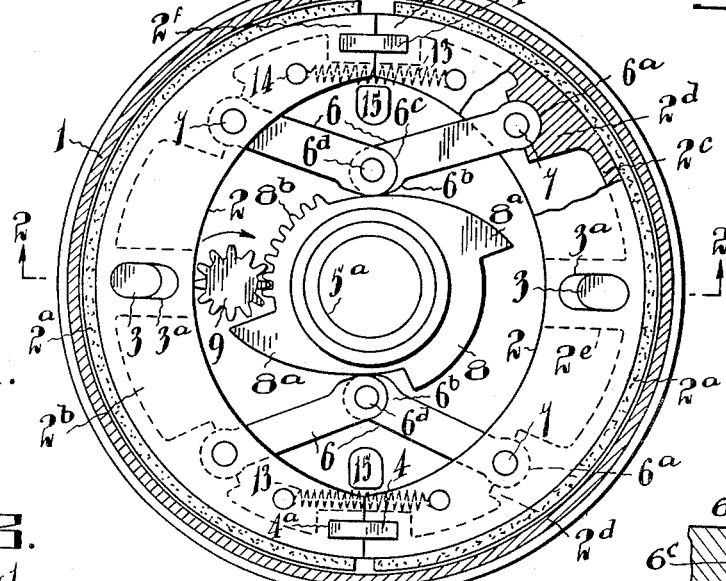
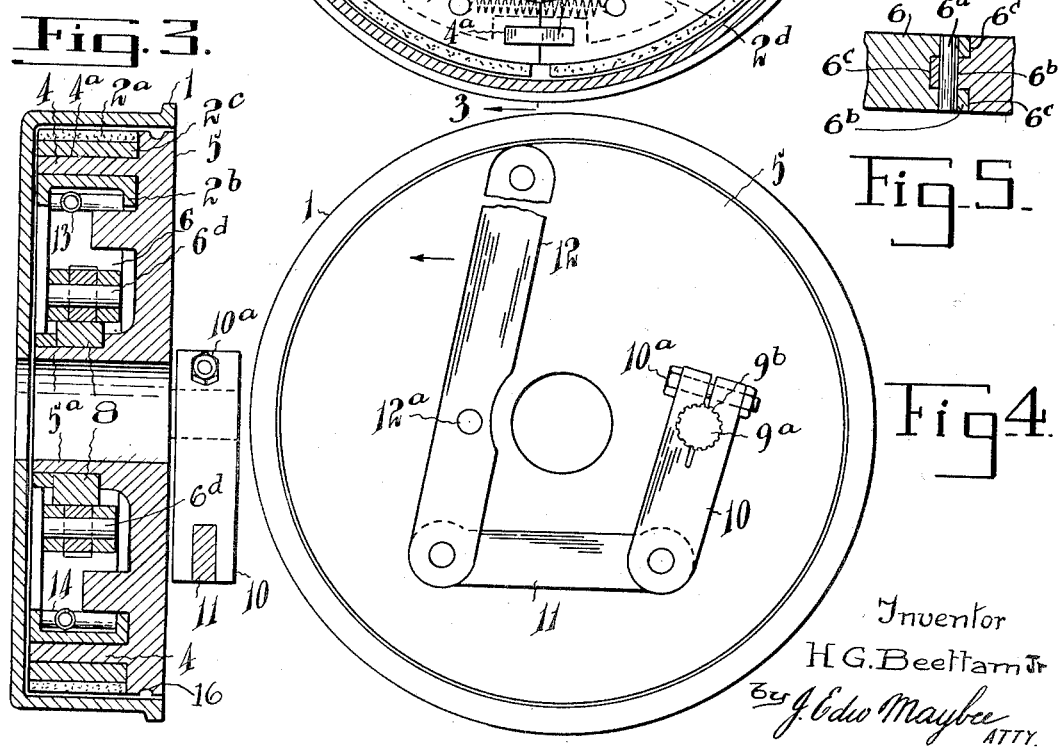
Inventor
H. G. Beettam Jr
By J. Edw Maybee
ATTY.

Patented Apr. 10, 1934

1,954,467

UNITED STATES PATENT OFFICE 1,954,467

BRAKE MECHANISM

Harry G. Beettam, Jr., Toronto, Ontario, Canada

Application April 28, 1932, Serial No. 607,983

9 Claims. (Cl. 188—78)

This invention relates to brake mechanisms and more particularly to the type usually employed on motor vehicles and the like and my object is to provide a simple and rugged brake mechanism that may be effectively operated with a minimum amount of effort on the part of the operator.

I attain my objects by mounting two brake shoes within a brake drum so that they will be moved bodily away from and towards one another to set and release the brake respectively. The adjacent ends of the shoes are connected together by two pairs of toggle links which are expanded by cam faces on a rotatable member. The latter is provided with gear teeth which are meshed with the teeth on a pinion. A crank arm adjustably mounted on the pinion is connected by a link with a manually operable lever.

The constructions are hereinafter more specifically described and illustrated in the accompanying drawing in which Fig. 1 is a side elevation of my braking mechanism, the brake drum being in section;

Fig. 2 a section on the line 2—2 in Fig. 1;

Fig. 3 a section on the line 3—3 in Fig. 1;

Fig. 4 a rear elevation;

Fig. 5 a longitudinal sectional detail of the hinge knuckle connection between the links of a toggle.

In the drawing like numerals of reference indicate corresponding parts in the different figures.

1 is a rotatable drum which may be secured to a wheel (not shown) of a vehicle. Within the drum are disposed two brake shoes 2 which are slidably mounted on guides 3 and bars 4 carried by a stationary plate 5. The plate 5 is secured to any suitable stationary part such as the housing of a rear-axle or a steering knuckle on a front axle (not shown).

The shoes 2 are provided with the usual friction linings $2^a$ for frictional engagement with the inner periphery of the drum 1. Two pairs of toggle links 6 are connected at 7 with the adjacent ends of the shoes which are U shaped in cross section, the flanges $2^b$ being connected by the web $2^c$ on which the lining $2^a$ is secured.

To remove the shearing stress on the connections between the toggle links and shoes I round the ends $6^a$ of the toggle links and mount them in open bearings formed in bosses $2^d$ located on the inner peripheries of the webs $2^c$ between the flanges $2^b$. The connections 7 comprise pins passed through the flanges and the toggle ends $6^a$, concentric to the latter. The pins are thus used only for withdrawing the shoes from engagement with the drum.

The links of each pair of toggle links 6 are connected together by a knuckle joint $6^b$ having the interengaging knuckles on one link snugly received in counterbores $6^c$ in the other link whereby shearing stress is also removed from the hinge pin $6^d$. That is to say the ends of the forked lugs on one link are rounded for engagement with a counterbore in the other link and the first mentioned link is counterbored between the lugs for engagement with a rounded end on the knuckle formed on the second mentioned link.

The toggles 6 are expanded to move the shoes 2 away from one another by a rotatable member 8 which is provided with two cam faces $8^a$ adapted to engage the knuckle joints $6^b$ of the toggles when the member is turned in one direction of rotation. The member is journalled on a hub $5^a$ on the plate 5 and is provided with a segmental gear $8^b$ the teeth of which are meshed with a pinion 9 journalled in the plate 5. The journal $9^a$ of the pinion extends through the plate and its end has a spline connection $9^b$ with a crank arm 10. The spline connection not only prevents relative rotary movement of these parts but permits adjustment to take up the wear of the brake linings $2^a$. The crank arm is provided with split lugs and a tightening screw $10^a$ for securing it in any desired position on the splines $9^b$. The free end of the crank arm is connected by means of a link 11 with a lever 12 which is pivoted at $12^a$ on the plate 5. This lever may be connected in any suitable manner with a foot pedal or hand lever located convenient to the operator.

The guides 3 and bars 4 extend laterally from the plate 5 and are passed through slots $3^a$ and notches $4^a$ formed in blocks $2^e$ and $2^f$ carried by the shoes 2. These blocks are formed on the inner peripheries of the web $2^c$ and extend across the gap between the flanges $2^b$.

From this description it is obvious that a movement in one direction of the lever 12 will cause the member 8 to be rotated to expand the toggles 6 whereby the shoes 2 will be moved away from one another on the guides 3 and bars 4 to apply an even pressure on the opposite sides of the brake drum 1. The guides 3 also serve to prevent the shoes from turning and the bars 4 prevent the ends of the shoes from chattering. That is to say, the co-operative faces of the bars 4, 4 and their notches $4^a$, $4^a$ are parallel to the direction of movement of the shoes so that the engagement of the shoes with the bars is maintained when the shoes are moved away from one another.

A movement of the lever 12 in the direction opposite the first mentioned movement imparted thereto will cause the rotation of the member 8 to be reversed and thus permit the toggles 6 to be contracted under the influence of springs 13 connected at 14 with the adjacent ends of the shoes 2. Stops 15 carried by the plate 5 are adapted to engage the toggles to limit their expanding movement and thus prevent the knuckle joints 6b from being moved into alinement with the pins 7.

The periphery of the plate 5 is provided with a groove 16 in which any suitable material (not shown) may be anchored for lightly engaging the brake drum 1 to exclude dirt and moisture from the brake shoe linings 2a.

What I claim as my invention is:

1. A brake comprising a rotatable brake drum; a stationary plate; a pair of brake shoes disposed within the drum, the shoes being suitably guided on the plate for movement away from and towards one another and being U shaped in cross section; bosses having open bearings carried between the U flanges of the shoes; two pairs of toggle links having their ends rounded to snugly fit the open bearings; means for maintaining the bearings and link ends in engagement when the toggles are contracted; and means for actuating the toggle links to move the shoes away from one another.

2. A brake comprising a rotatable brake drum; a stationary plate; a pair of brake shoes disposed within the drum, the shoes being suitably guided on the plate for movement away from and towards one another and being U shaped in cross section; bosses having open bearings carried between the U flanges of the shoes; two pairs of toggle links having their ends rounded to snugly fit the open bearings; pivotal connections between the said ends of the toggle links and the flanges of the shoes concentric to the open bearings; and means for actuating the toggle links to move the shoes away from one another.

3. A brake comprising a rotatable brake drum; a stationary plate; a pair of brake shoes disposed within the drum, the shoes being suitably guided on the plate for movement away from and towards one another and being U shaped in cross section; bosses having open bearings carried between the U flanges of the shoes; two pairs of toggle links having their ends rounded to snugly fit the open bearings; means for maintaining the bearings and link ends in engagement when the toggles are contracted; and a rotatable member having two cam faces, each face being adapted to engage a pair of toggle links at the point of connection thereof.

4. A brake comprising a rotatable brake drum; a stationary plate; a pair of brake shoes disposed within the drum and suitably guided on the plate for movement away from and towards one another; two pairs of toggle links having pivotal connections with opposite ends of the shoes; a member having two cam faces, each face being adapted to engage a pair of toggle links at the point of connection thereof; a segmental gear carried by the member; a pinion journalled in the plate and meshed with the said segmental gear; a crank arm adjustably mounted on the journal of the pinion; a manually operable lever pivoted on the plate; and a link connecting the lever and arm.

5. A brake comprising a rotatable brake drum; a stationary plate provided with laterally extending guides and bars; a pair of brake shoes disposed within the drum and being U shaped in cross section, the flanges of the U being parallel to the plate; blocks connecting the flanges, the blocks and flanges having slots therethrough for receiving the guides and having notches for embracing the bars; two pairs of toggle links having pivotal connections with opposite ends of the shoes; and a rotatable member having two cam faces, each face being adapted to engage a pair of toggle links at the point of connection thereof.

6. A brake comprising a rotatable brake drum; a stationary plate provided with laterally extending guides and bars; a pair of brake shoes disposed within the drum and being U shaped in cross section, the flanges of the U being parallel to the plate; blocks connecting the flanges, the blocks and flanges having slots therethrough for receiving the guides and having notches for embracing the bars; two pairs of toggle links having pivotal connections with opposite ends of the shoes; and means for actuating the toggle links to move the shoes away from one another.

7. A brake comprising a rotatable brake drum; a stationary plate provided with laterally extending guides and bars; a pair of brake shoes disposed within the drum and being U shaped in cross section, the flanges of the U being parallel to the plate; blocks connecting the flanges, the blocks and flanges having slots therethrough for receiving the guides and having notches for embracing the bars; bosses having open bearings carried between the U flanges of the shoes; two pairs of toggle links having their ends rounded to snugly fit the open bearings; means for maintaining the bearings and the link ends in engagement when the toggles are contracted; and means for actuating the toggle links to move the shoes away from one another.

8. A brake comprising a rotatable brake drum; a stationary plate provided with laterally extending bars; a pair of brake shoes disposed within the drum and being U-shaped in cross section, the flanges of the U being parallel to the plate; blocks connecting the flanges, the blocks and flanges having notches for embracing the bars; two pairs of toggle links having pivotal connections with opposite ends of the shoes; and means for actuating the toggle links to move the shoes away from one another.

9. A brake comprising a rotatable brake drum; a stationary plate; a pair of brake shoes disposed within the drum, the shoes being suitably guided on the plate for movement away from and towards one another and being U-shaped in cross-section; bosses having open bearings carried between the U flanges of the shoe; two pairs of toggle links having their ends rounded to snugly fit the open bearings; means for maintaining the bearings and link ends in engagement when the toggles are contracted; means for connecting the links of each pair of toggle links including a knuckle joint having the knuckles on one link snugly received in the other link; and a rotatable member having two cam faces, each face being engaged with a knuckle joint.

HARRY G. BEETTAM, Jr.